(12) United States Patent
Chen

(10) Patent No.: US 10,495,226 B2
(45) Date of Patent: Dec. 3, 2019

(54) PRESS-ROTATE-TYPE ELECTRONIC CIGARETTE

(71) Applicant: SHENZHEN IVPS TECHNOLOGY CO., LTD., Shenzhen, Guangdong Province (CN)

(72) Inventor: Wen Chen, Shenzhen (CN)

(73) Assignee: SHENZHEN IVPS TECHNOLOGY CO., LTD. (CN)

( * ) Notice: Subject to any disclaimer, the term of this patent is extended or adjusted under 35 U.S.C. 154(b) by 163 days.

(21) Appl. No.: 15/876,099

(22) Filed: Jan. 19, 2018

(65) Prior Publication Data
US 2018/0209542 A1 Jul. 26, 2018

(30) Foreign Application Priority Data

Jan. 23, 2017 (CN) .................. 2017 2 0093737 U

(51) Int. Cl.
*A24F 13/00* (2006.01)
*F16J 15/02* (2006.01)
*A24F 47/00* (2006.01)

(52) U.S. Cl.
CPC .......... *F16J 15/021* (2013.01); *A24F 47/002* (2013.01)

(58) Field of Classification Search
CPC ..................................... A24F 47/00
USPC .................................... 131/328–329
See application file for complete search history.

(56) References Cited

U.S. PATENT DOCUMENTS

| | | | |
|---|---|---|---|
| 9,861,772 B2* | 1/2018 | Terry | A24F 47/008 |
| 10,343,827 B2* | 7/2019 | Tapocik | |
| 2007/0163608 A1* | 7/2007 | Tarlow | A24F 15/20 131/240.1 |
| 2018/0093802 A1* | 4/2018 | Paganuzzi | B65D 50/041 |

* cited by examiner

*Primary Examiner* — Phuong K Dinh
(74) *Attorney, Agent, or Firm* — IP-PAL Patent US

(57) ABSTRACT

The disclosure provides a press-rotate-type electronic cigarette comprising an upper-cover assembly, an oil tank and a lower-cover assembly. The upper-cover assembly comprises an inner ring and an outer ring, the inner ring accommodated in a space defined in the outer ring. Either one of the inner ring and the outer ring is set with a buckle and the other one is set with a buckling slot suitable for the buckle. An elastic assembly is set between the inner ring and the outer ring, and the outer ring is apart from the inner ring under the elastic action of the elastic assembly so that the buckle detaches from the buckling slot. By setting the elastic assembly between the inner ring and the outer ring, the inner ring cannot be rotated and separated directly. Only when the buckle matches with the buckling slot, the upper-cover assembly could be rotated and separated.

9 Claims, 2 Drawing Sheets

PRESS-ROTATE-TYPE ELECTRONIC CIGARETTE

CROSS REFERENCE TO RELATED APPLICATIONS

The present application claims priority to Chinese Patent Application CN 201720093737.1 filed on Jan. 23, 2017.

TECHNICAL FIELD

The present disclosure relates to electronic cigarette field, and particularly to a press-rotate-type electronic cigarette.

BACKGROUND

During burning processes, cigarettes will produce harmful smoke containing nicotine and tar, and that hurt the health of the smokers seriously. To minimize the harm comes from cigarettes to smokers, electronic cigarette is an alternative for the traditional cigarette. Electronic cigarette produces smoke by heating oil. In the present electronic cigarette, the upper-cover can be opened by rotating. If the electronic cigarette is not proper stored, kids could obtain it and open the upper-cover easily. And then oil is exposed in the air. Due to insufficient understanding, kids may drink the oil and that cause hurt.

SUMMARY

The present disclosure mainly aims to provides a press-rotate-type electronic cigarette in order to resolve the question in the present that it cannot efficiently avoid opening electronic cigarette by kids.

To resolve the above questions, the present disclosure provides an electronic cigarette. The electronic cigarette comprises an upper-cover assembly, an oil tank and a lower-cover assembly. The upper-cover assembly comprises an upper-cover inner ring and an upper-cover outer ring, and the upper-cover inner ring is accommodated in a space defined in the upper-cover outer ring. Either of the upper-cover inner ring and the upper-cover outer ring is set with a buckle and the other one is set with a buckling slot suitable for the buckle.

An elastic assembly is set between the upper-cover inner ring and the upper-cover outer ring. The upper-cover outer ring is apart from the upper-cover inner ring under the elastic action of the elastic assembly so that the buckle detaches from the buckling slot.

Preferably, the oil tank is set on a side of the upper-cover assembly closed to the upper-cover inner ring, and a side of the upper-cover assembly far away from the oil tank is set with a dripping nozzle assembly. The dripping nozzle assembly comprises a dripping nozzle seat and a dripping nozzle head. The dripping nozzle seat passes through the first through-hole defined in the upper-cover outer ring and connects with the upper-cover inner ring.

Preferably, the dripping nozzle seat is detachably connected with the upper-cover inner ring through a rotate.

Preferably, the upper-cover inner ring is detachably connected with the oil tank through a rotate.

Preferably, a total number of the buckle is one, a total number of the buckling slot is two, the buckling slots are angle-uniformly set on the upper-cover inner ring or the upper-cover outer ring.

Preferably, the elastic assembly is a silicon ring.

Preferably, the buckle is a trapezium with a width of a fixed end being greater than a width of a free end.

Preferably, a thickness of the elastic assembly is greater than or equal to a height of the buckle.

Preferably, the lower-cover assembly is set with an atomizer, and the atomizer communicates with the oil tank and the upper-cover assembly.

The technical solution of the present disclosure comprises an upper-cover assembly, an oil tank and a lower-cover assembly. The upper-cover assembly comprises an upper-cover inner ring and an upper-cover outer ring, and the upper-cover inner ring is accommodated in a space defined in the upper-cover outer ring. Either of the upper-cover inner ring and the upper-cover outer ring is set with a buckle and the other one is set with a buckling slot suitable for the buckle. An elastic assembly is set between the upper-cover inner ring and the upper-cover outer ring. The upper-cover outer ring is apart from the upper-cover inner ring under the elastic action of the elastic assembly so that the buckle detaches from the buckling slot. In the present technical solution, by setting the upper-cover outer ring and the upper-cover inner ring accommodated in upper-cover outer ring, and by setting the elastic assembly between the upper-cover inner ring and the upper-cover outer ring, the upper-cover inner ring cannot be rotated and separated directly. Only when the buckle matches with the buckling slot, the upper-cover assembly could be rotated and separated in order to avoid the hurt when kids rotate and detach the electronic cigarette.

BRIEF DESCRIPTION OF THE DRAWINGS

For a better understanding of the embodiments of the present disclosure or the technical scheme in the prior art, accompanying drawings needed in the description of the embodiments or the prior art are simply illustrated below. Obviously, the accompanying drawings described below are some embodiments of the present disclosure. For the ordinary skill in the field, other accompanying drawings may be obtained according to the structure shown in these accompanying drawings without creative work.

DESCRIPTION OF THE REFERENCE NUMBER

Figure 1:
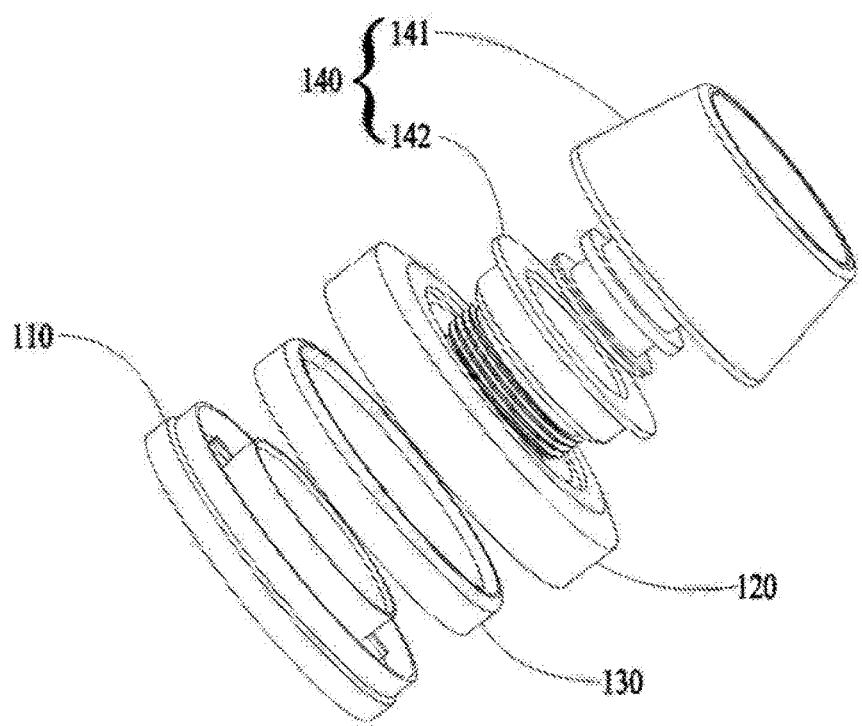
FIG. 1 is an exploded view of the upper-cover assembly of the present disclosure.

| Reference number | Part |
|---|---|
| 100 | upper-cover assembly |
| 110 | upper-cover inner ring |
| 120 | upper-cover outer ring |
| 111 | buckle |
| 121 | Buckling slot |
| 130 | silicon ring |
| 140 | dripping nozzle assembly |
| 141 | dripping nozzle seat |
| 142 | dripping nozzle head |

-continued

| Reference number | Part |
|---|---|
| 200 | Oil tank |
| 300 | lower-cover assembly |

The implementation of aims, the function features and the advantages of the present disclosure are described below in further detail in conjunction with embodiments with reference to the drawings.

DETAILED DESCRIPTION

A clear and complete description as below is provided for the technical scheme in the embodiments of the present disclosure in conjunction with the drawings in the embodiments of the present disclosure. Obviously, the embodiments described hereinafter are simply part embodiments of the present disclosure, but all the embodiments. All other embodiments obtained by the ordinary skill in the art based on the embodiments in the present disclosure without creative work are intended to be included in the scope of protection of the present disclosure.

It should be noted that all directional indications (such as top, bottom, left, right, front, behind . . . ) in the embodiments of the present disclosure are merely to illustrate a relative position relation, a relative motion condition, etc. between each part in a certain state (for example, the state shown in the drawings). If the state changes, the directional indication changes accordingly.

In addition, if terms "first", "second", etc. appear in the present disclosure, they are merely for the purpose of description, but cannot be understood as the indication or implication of relative importance or as the implicit indication of the number of the designated technical features; therefore, features defined by "first" and "second" may specifically or implicitly include at least one such feature. In the description of the present disclosure, unless there is a definite and specific restriction, "many" means at least two, such as two or three.

In the present disclosure, unless otherwise specifically stated and defined, terms "connected", "fixed", etc. should be interpreted expansively. For example, "fixed" may be fixed connection, also may be detachable connection, or integration; may be mechanical connection, also may be electrical connection; may be direct connection, also may be indirect connection through an intermediate, and may be internal communication between two elements or interaction of two elements, unless otherwise specifically defined. The ordinary skill in this field can understand the specific implication of the above terms in the present disclosure according to specific conditions.

In addition, technical schemes of each embodiment of the present disclosure may be combined mutually; however, this must be carried out on the basis that the ordinary skill in this field can implement the combination. When the combination of technical schemes has a conflict or cannot be implemented, it should be considered that such combination of technical schemes does not exist and is not in the scope of protection claimed by the present disclosure.

The present disclosure provides a press-rotate-type electronic cigarette.

Figure 2:
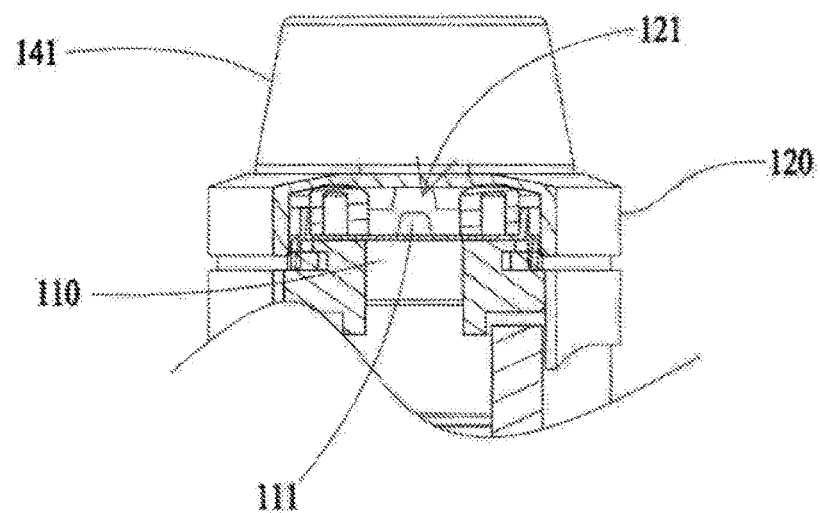
FIG. 2 is an inner structural schematic view of the upper-cover assembly of the present disclosure.
Figure 3:
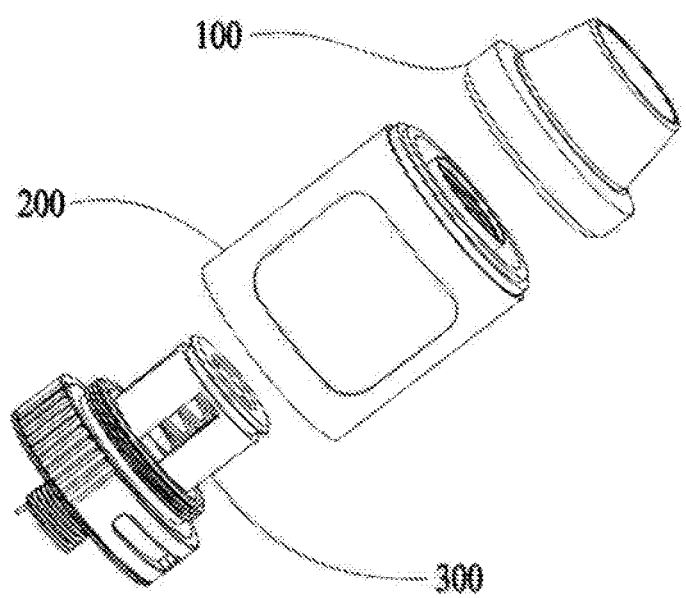
FIG. 3 is a structural schematic view of the electronic cigarette of the present disclosure.

Illustrated as FIG. 1 to FIG. 3, the technical solution of the present disclosure comprises an upper-cover assembly 100, an oil tank 200 and a lower-cover assembly 300. The upper-cover assembly 100 comprises an upper-cover inner ring 110 and an upper-cover outer ring 120. The upper-cover inner ring 110 is accommodated in a space defined in the upper-cover outer ring 120. Either of the upper-cover inner ring and the upper-cover outer ring is set with a buckle, and the other one is set with a buckling slot suitable for the buckle.

It should be understood that, in the present embodiment an opening of the oil tank 200 is set on a side facing the upper-cover assembly 100. In particular using, the upper-cover assembly 100 and the lower-cover assembly 300 are respectively set on two ends of the oil tank 200. And the oil is added by opening the upper-cover assembly 100. In the present embodiment, the oil tank 200 and the lower-cover assembly 300 are an oil tank 200 and a lower-cover assembly 300 in the prior art. In the technical solution of the present disclosure, either of the upper-cover inner ring 110 and the upper-cover outer ring 120 is set with a buckle 111, and the other one is set with a buckling slot 121 suitable for the buckle 111. In the present embodiment, for example, the upper-cover inner ring 110 is set with the buckle 111, and the upper-cover outer ring 120 is set with the buckling slot 121. In particular using, the upper-cover inner ring 110 is accommodated in a space defined in the upper-cover outer ring 120. So the user cannot contact with the upper-cover inner ring 110 directly, and can contact with the upper-cover outer ring 120 only.

An elastic assembly is set between the upper-cover inner ring 110 and the upper-cover outer ring 120. The upper-cover outer ring 120 separates the upper-cover inner ring 110 under the elastic action of the elastic assembly so that the buckle 111 detaches from the buckling slot 121.

In the present embodiment, preferably a silicon ring 130 is chosen as the elastic assembly. Because of the silicon ring 130 having a relative high coefficient of elasticity, kids cannot compress the silicon ring 130 because of lack of enough force. A spring or an elastic plate could also be used to provide elastic force. But they are not preferably suitable for comparing with the silicon ring 130. The silicon ring 130 is set between the upper-cover inner ring 110 and the upper-cover outer ring 120. When there is no extra force, the upper-cover outer ring 120 is apart from the upper-cover inner ring 110 because of the elastic force. At this time, the buckle 111 detaches from the buckling slot 121. When the upper-cover outer ring 120 is rotated, the upper-cover inner ring 110 keeps still. When press the upper-cover outer ring 120 in a direction facing the upper-cover inner ring 110, the buckle 111 is stuck in the buckling slot 121. At this time, if the upper-cover outer ring 120 is rotated, the upper-cover inner ring 110 is rotated simultaneously. At this time, if depress the upper-cover inner ring 110 with no extra force, the upper-cover inner ring 110 will be apart from the upper-cover outer ring 120 again, and they cannot rotate simultaneously.

In the present embodiment, by setting the upper-cover inner ring 110, the upper-cover outer ring 120 and the elastic assembly, and by setting the buckle 111 on either of the upper-cover inner ring 110 and the upper-cover outer ring 120 and setting the buckling slot 121 on the other one, the upper-cover assembly 10 could be opened only by pressing with force. Kids cannot have enough force to press the upper-cover inner ring 110 so that they cannot open the upper-cover. The technical solution of the present disclosure can prevent kids from contacting with oil efficiently.

Preferably, the oil tank 200 is set on a side of the upper-cover assembly 100 closed to the upper-cover inner ring 110, and a side of upper-cover assembly 100 far way from the oil tank 200 is set with the dripping nozzle assembly 140. The dripping nozzle assembly 140 comprises a dripping nozzle seat 141 and a dripping nozzle head 142. The dripping nozzle seat 141 passes through the first through-hole defined in the upper-cover outer ring 120 and connects with the upper-cover inner ring 110. Preferably, the dripping nozzle seat 141 is detachably connected with the upper-cover inner ring 110 through a rotate.

In the present embodiment, a side of the upper-cover assembly 100 closed to the upper-cover outer ring 120 is set with the dripping nozzle assembly 140. The dripping nozzle seat 141 is fixed on the upper-cover inner ring 110 through a rotate in order to facilitate detachment. The dripping nozzle head 142 is a dripping nozzle head 142 in the prior art, using for atomizing smoke for users.

Preferably, the upper-cover inner ring 110 is detachably connected with the oil tank 200 through a rotate.

What should be understood is, in the present embodiment, after the upper-cover assembly 100 is opened, the opening of the oil tank 200 is exposed in order to add oil. In the present embodiment, the upper-cover inner ring 110 is detachably connected with the oil tank 200 through a rotate. When there is no extra force pressing on the upper-cover outer ring 120, the upper-cover inner ring 110 and the upper-cover outer ring 120 is apart from each other, and the upper-cover inner ring 110 is not exposed in the air. So the upper-cover inner ring 110 could not be rotated. When press the upper-cover outer ring 120 with a force facing the upper-cover inner ring 110, the upper-cover inner ring 110 and the upper-cover outer ring 120 could be rotated simultaneously. At this moment, by rotating the upper-cover outer ring 120, the upper-cover inner ring 110 is rotated, and so that the upper-cover inner ring 110 is rotated relative to the oil tank 200. So the upper-cover inner ring 110 separates from the oil tank 200, to separate the upper-cover assembly 100 from the oil tank 200.

Preferably, a total number of the buckle 111 is one, and a total number of the buckling slot 121 is at least one. The buckling slot 121 is angle-uniformly set on the upper-cover inner ring 110 or the upper-cover outer ring 120. Preferably, the buckle 111 is a trapezium with a width of a fixed end being greater than a width of free end. Preferably, a thickness of the elastic assembly is greater than or equal to the height of the buckle 111.

In the present embodiment, one buckle 111 is set to meet the request, and a total number of buckling slot 121 is at least one. What should be understood is, if only one buckling slot 121 is set, the upper-cover outer ring 120 may need to be rotated for a circle so that the buckle 111 matches with the buckling slot 121. And if two buckling slots 121 are set, the upper-cover outer ring 120 need to be rotated for half a circle so that the buckle 111 matches with the buckling slot 121. Correspondingly, the more buckling slots 121 are set, the easier the buckle 111 matches with the buckling slot 121. What should be understood is, the buckling slots 121 have a total degree of 360°. The more the buckling slots 121 are set, the smaller the width of the buckling slot 121 and the buckle 111 will be. And that will affect the strength. In the present embodiment, preferably 6 buckling slots 121 are set so that at most only 60° needed to be rotated to match the buckle 111 with the buckling slots 121 so as to guarantee a good strength of buckle 111 at the same time. That results the best performance. Apparently, in order to detach buckle 111 from the buckling slot 121, in the present embodiment the thickness of the elastic assembly, namely silicon ring 130, is greater than the height of the buckle 111.

Shown as FIG. 3, preferably the lower-cover assembly 300 is set with an atomizer, and the atomizer communicates with the oil tank 200 and the dripping nozzle assembly 140 respectively.

In the present embodiment, the lower-cover assembly 300 is set with the atomizer, and the atomizer is an atomizer in the prior art using in the electronic cigarette. The atomizer communicates with the oil tank 200 and the dripping nozzle assembly 140 respectively. In using, the atomizer gains oil from the oil tank 200, and vapors and delivers the oil to the dripping nozzle assembly 140 so as to realize the work of the electronic cigarette.

The above are preferred embodiments of the present disclosure merely and are not intended to limit the patent scope of the present disclosure. Any equivalent structures made according to the description and the accompanying drawings of the present disclosure without departing from the idea of the present disclosure, or any equivalent structures applied in other relevant technical fields directly or indirectly are intended to be included in the patent protection scope of the present disclosure.

What is claimed is:

1. A press-rotate-type electronic cigarette, wherein the electronic cigarette comprises an upper-cover assembly, an oil tank and a lower-cover assembly, the upper-cover assembly comprises an upper-cover inner ring and an upper-cover outer ring, the upper-cover inner ring is accommodated in a space defined in the upper-cover outer ring, either of the upper-cover inner ring and the upper-cover outer ring is set with a buckle and the other one is set with a buckling slot suitable for the buckle:

an elastic assembly is set between the upper-cover inner ring and the upper-cover outer ring, the upper-cover outer ring is apart from the upper-cover inner ring under the elastic action of the elastic assembly so that the buckle detaches from the buckling slot.

2. The electronic cigarette according to claim 1, wherein the oil tank is set on a side of the upper-cover assembly closed to the upper-cover inner ring, a side of the upper-cover assembly far away from the oil tank is set with a dripping nozzle assembly, the dripping nozzle assembly comprises a dripping nozzle seat and a dripping nozzle head, the dripping nozzle seat passes through the first through-hole defined in the upper-cover outer ring and connects with the upper-cover inner ring.

3. The electronic cigarette according to claim 2, wherein the dripping nozzle seat is detachably connected with the upper-cover inner ring through a rotate.

4. The electronic cigarette according to claim 2, wherein the upper-cover inner ring is detachably connected with the oil tank through a rotate.

5. The electronic cigarette according to claim 1, wherein a total number of the buckle is one, a total number of the buckling slot is two, the buckling slots are angle-uniformly set on the upper-cover inner ring or the upper-cover outer ring.

6. The electronic cigarette according to claim 1, wherein the elastic assembly is a silicon ring.

7. The electronic cigarette according to claim 1, wherein the buckle is a trapezium with a width of a fixed end being greater than a width of a free end.

8. The electronic cigarette according to claim 7, wherein a thickness of the elastic assembly is greater than or equal to a height of the buckle.

9. The electronic cigarette according to claim 1, wherein the lower-cover assembly is set with an atomizer, the atomizer communicates with the oil tank and the upper-cover assembly.

* * * * *